United States Patent [19]

Hotta

[11] 4,240,123

[45] Dec. 16, 1980

[54] POWER BREAKER SYSTEM

[75] Inventor: Shigenori Hotta, Nagoya, Japan

[73] Assignee: Mitsubishi Denki Kabushiki Kaisha, Tokyo, Japan

[21] Appl. No.: 967,729

[22] Filed: Dec. 8, 1978

[30] Foreign Application Priority Data

Aug. 8, 1978 [JP] Japan .................. 53-108725[U]

[51] Int. Cl.³ .................................. H02H 3/093
[52] U.S. Cl. .................................. 361/96; 361/63
[58] Field of Search .................. 361/63, 62, 65, 64, 361/66, 95, 96, 97, 58, 104

[56] References Cited

U.S. PATENT DOCUMENTS

| | | | |
|---|---|---|---|
| 2,502,992 | 4/1950 | Rawlins et al. | 361/104 |
| 2,875,382 | 2/1959 | Sandin et al. | 361/96 |
| 2,919,328 | 12/1959 | Kozacka | 361/104 X |
| 2,920,164 | 1/1960 | Edsall | 361/96 X |
| 3,070,728 | 12/1962 | Edmunds | 361/104 X |
| 3,859,565 | 1/1975 | Henningsen | 361/96 X |

*Primary Examiner*—Patrick R. Salce
*Attorney, Agent, or Firm*—Oblon, Fisher, Spivak, McClelland & Maier

[57] ABSTRACT

A power breaker system comprises a main breaker connected to a power source; a plurality of feeder circuit breakers; a long-timing breaking delay circuit and a short-timing breaking delay circuit for delaying the total breaking time by a trip mechanism of the main breaker; and a current limiting circuit for limiting the fault current.

5 Claims, 9 Drawing Figures

POWER BREAKER SYSTEM

BACKGROUND OF THE INVENTION

1. Field of the Invention

The present invention relates to a power breaker system which selectively breaks only a fault circuit formed by a load shortcircuit etc. in a power system.

2. Description of the Prior Art

Heretofore, it has been known to use the system shown in FIG. 1 wherein the reference (M) designates a main breaker for wiring which is connected to a power source at one terminal; ($F_1$), ($F_2$) . . . ($F_n$) respectively designate feeder circuit breakers for wiring which are respectively connected between the other terminal and each of the loads.

In the conventional power breaker system shown in FIG. 1, when a short-circuit fault is caused in one load circuit having a feeder circuit breaker ($F_1$), it is necessary to actuate only the feeder circuit breaker ($F_1$) before actuating the main breaker (M) in order to continue the feeding to the non-fault load circuit while breaking only the fault load circuit.

Thus, the main breaker (M) has a structure for breaking by a large breaking current larger than the breaking current for the feeder circuit breakers ($F_1$), ($F_2$) . . . ($F_n$) or by said large current and a predetermined delay time.

A bimetal thermal actuating type or an electromagnetic type trip mechanism has been used as the conventional trip mechanism of the main breaker for the short-circuit current. However, in any conventional system, it has been considered to be impossible to break selectively the circuit in all fault current ranges. That is, the operating characteristics of the main breaker (M) and the feeder circuit breaker ($F_1$) under a short-circuit fault in a load (not shown) connected to the feeder circuit breaker ($F_1$) are shown in FIG. 2. In the large fault current range, the main breaker (M) is simultaneously actuated together with the feeder circuit breaker ($F_1$) whereby the selective breakable range is limited to only a small fault current range. It has been known to use a power breaker system shown in FIG. 3 which has a trip timing characteristic of the main breaker (M) to cause a delay actuation whereby the selective breaking has been attained for certain fault current range. However, the selective breakable range has been small as a current of about 10 KA to 20 KA. Thus, the industrial value of such system is not high enough in practical use.

It has been considered to provide a system shown in FIG. 4 for selectively breaking in a large current range. However, the total breaking time t of the main breaker (M) is prolonged to be over the allowable limit $I^2t$ (I: breaking current) as the durability of the main breaker (M). In order to keep the allowable limit $I^2t$, the breaking capacity (that is t) of the main breaker (M) should be decreased to reduce the industrial value in the practical use.

SUMMARY OF THE INVENTION

It is an object of the present invention to overcome the above-mentioned disadvantage.

The present invention is to provide a power circuit breaker system which comprises a circuit breaking delay circuit for delaying the total breaking time for a specific time by a trip mechanism of the main breaker and a current limiting circuit for limiting a fault current below a predetermined level whereby a selective breakable range is enlarged.

DETAILED DESCRIPTION OF THE PREFERRED EMBODIMENT

Figure 1:
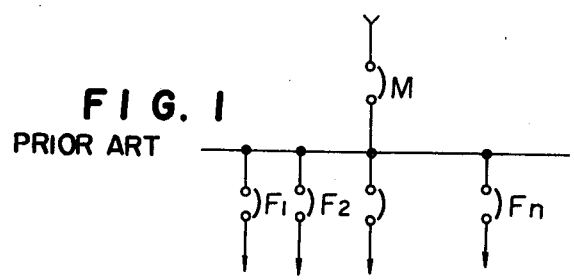
FIG. 1 shows a system of the conventional power breaker.
Figure 2:
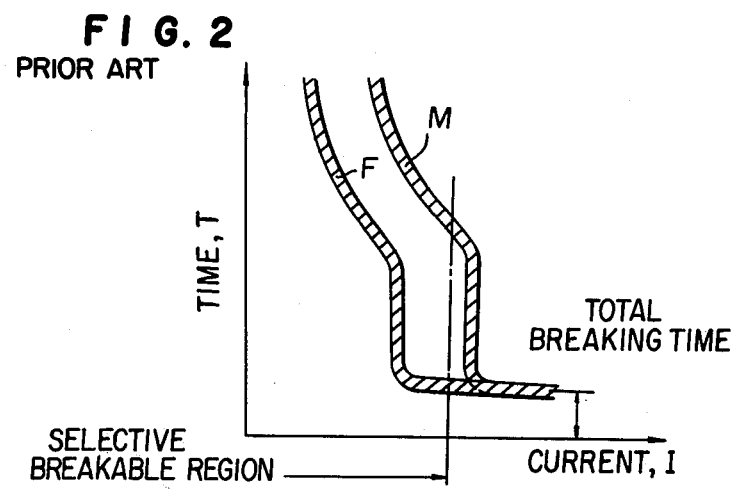
FIG. 2 shows operating characteristic curves of the conventional system shown in FIG. 1.
Figure 3:
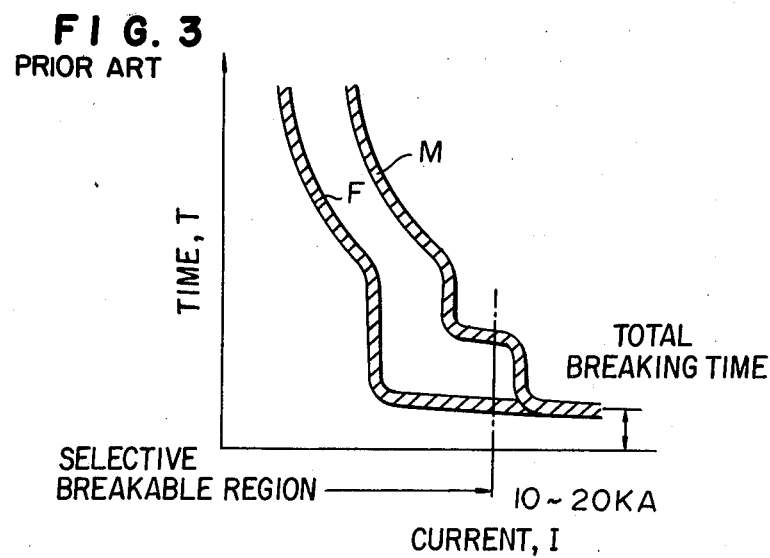
FIGS. 3 and 4 respectively show operating characteristic curves of the conventional system while expanding a selective breakable region.
Figure 4:
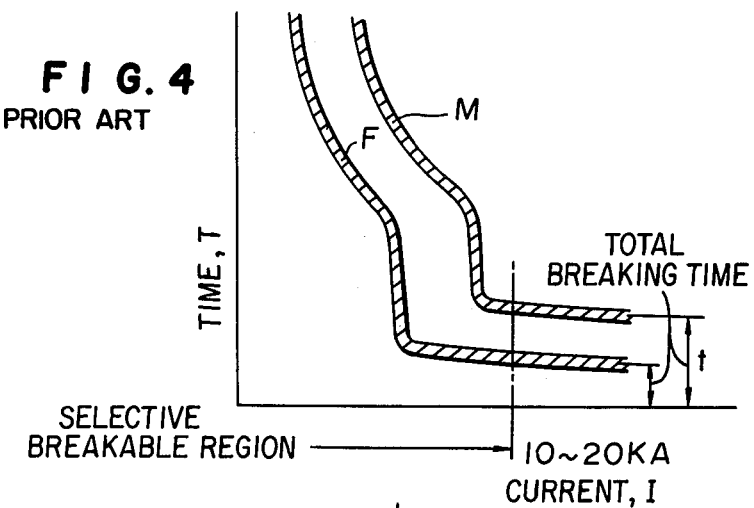

Referring to the drawings, one embodiment of the present invention will be illustrated.

Figure 5:
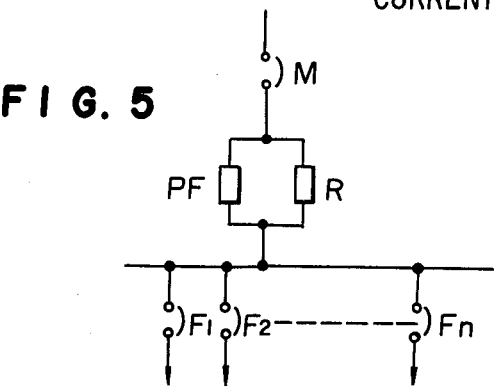
FIG. 5 shows a system of a power breaker according to the present invention.
Figure 8:
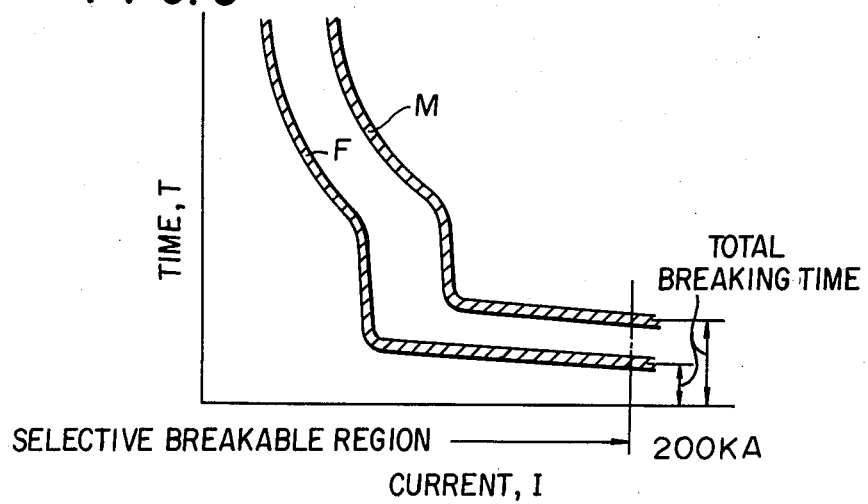
FIG. 8 shows operating characteristic curves of the power breaker of the present invention.

In FIG. 5, the reference (M) designates a main breaker for wiring; (PF) designates a permanent fuse; (R) designates a resistor; and a current limiting circuit is formed by the permanent fuse (PF) and the resistor (R) in parallel; and ($F_1$), ($F_2$) . . . ($F_n$) designate feeder circuit breakers for wiring.

Figure 6:
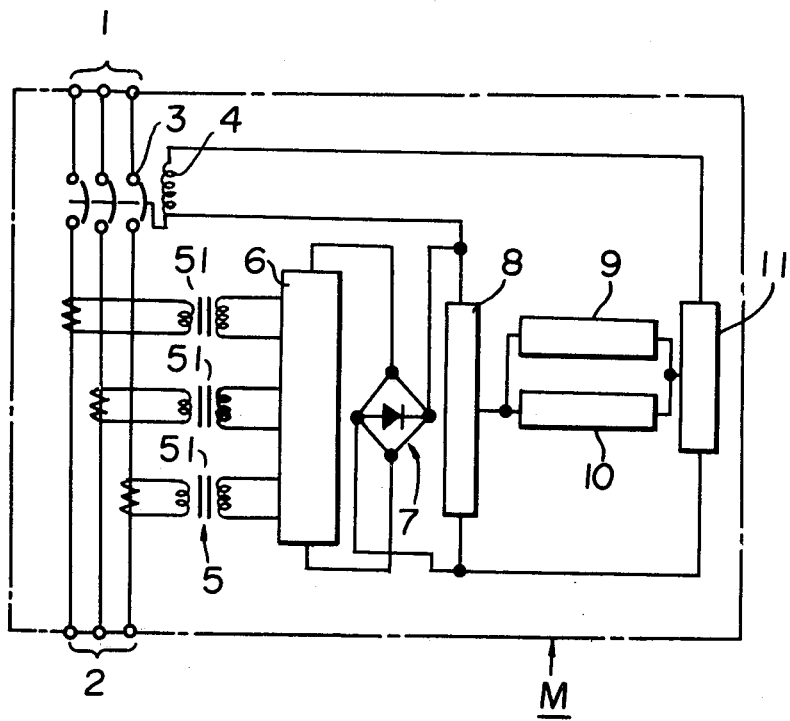
FIG. 6 is a circuit diagram of a main breaker of the system of the present invention.

The main breaker (M) for wiring has the structure shown by the functional block diagram of FIG. 6. In FIG. 6, the reference (1) designates a terminal in a power source side; (2) designates a terminal in a load side; (3) designates switch mechanism; (4) designates a trip coil; (5) designates a current transformer having an intermediate current transformer (51); (6) designates a maximum current detecting circuit; (7) designates an all wave rectifier; (8) designates a voltage sensor; (9) designates a long-timing circuit and (10) designates a short-timing circuit and (11) designates a trigger circuit.

The operation of the system will be illustrated.

In FIG. 6 showing the functional structure of the main breaker (M), the current for each phase passing the main circuit (between the terminals (1) and (2)) is detected in the primary side of the current transformer (5). For example, about 5 A of current is passed in the secondary side and the current is reduced to 50 mA by the intermediate current transformer (51). The reduced current (the order of mA) is fed into the maximum current detecting circuit (6) wherein the maximum current value in each phase is detected and it is rectified as all-wave rectification by the rectifier (7) and it is fed into the voltage sensor (8) wherein the input is converted to the voltage and the voltage is output as an operating signal to the long-timing circuit (9) and the short-timing circuit (10). When the voltage signal is remarkably large (a large overcurrent is passed through the main circuit), the short-timing circuit (10) is actuated to output the trigger signal to the trigger circuit (11). When the overcurrent is not so large, the long-timing circuit (9) is actuated to output the trigger signal to the trigger circuit (11).

When the trigger circuit (11) is actuated, the trip coil (4) is excited to open the switching mechanism (3) whereby the fault current is broken.

The maximum current detecting circuit (6), the voltage sensor (8), the long-time circuit (9) and the short-timing circuit (10) will be further illustrated.

Figure 9:
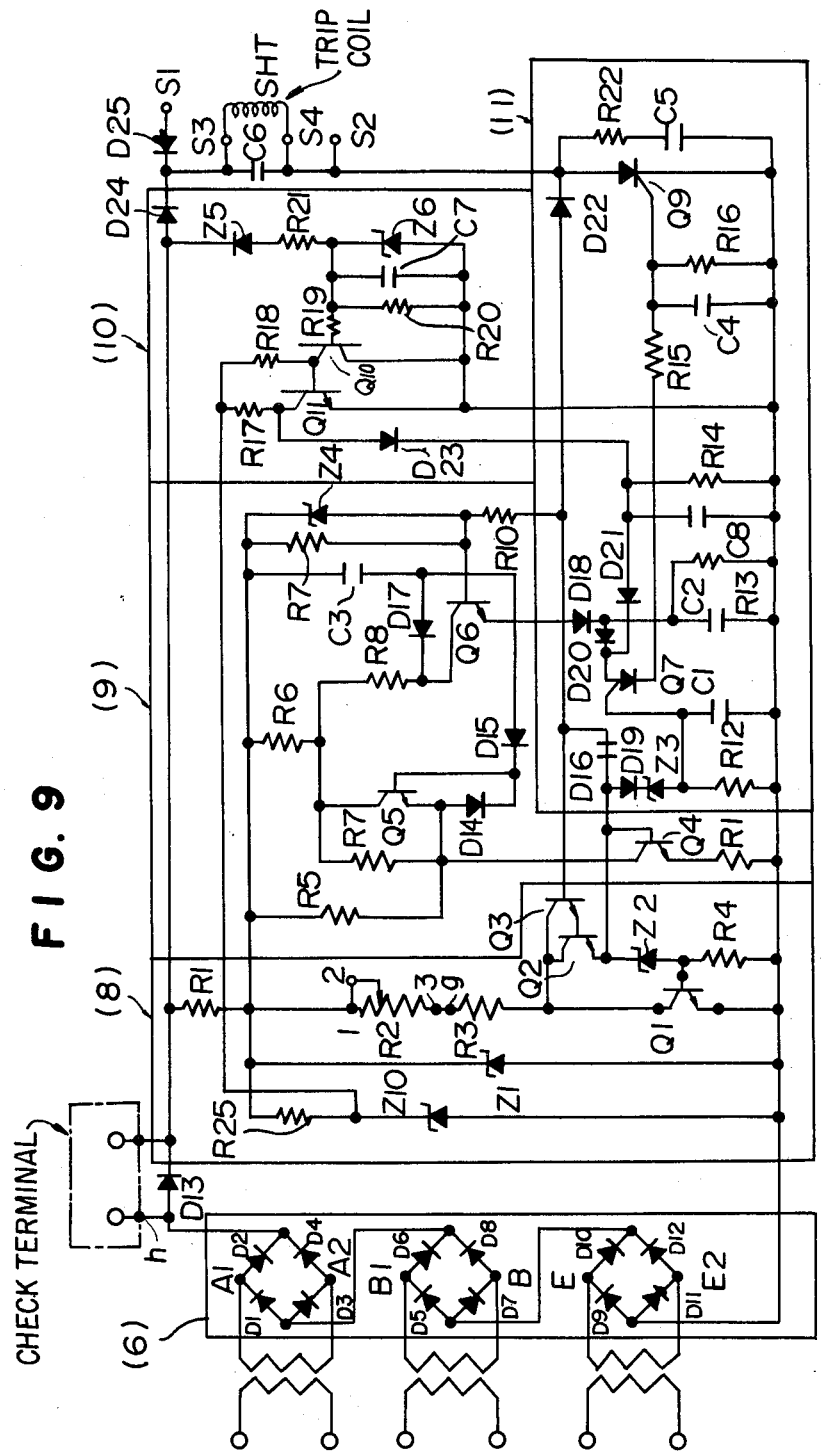
FIG. 9 is a circuit diagram of one embodiment of the main breaker of FIG. 6.

In FIG. 9, the maximum current detecting circuit (6) has three diode bridges corresponding to each phase of the feeder, and the diode bridges are connected in series whereby the maximum current is passed to the voltage sensor (8).

In the voltage sensor (8), the maximum current given by the maximum current detecting circuit (6) is converted to the corresponding voltage by the resistors ($R_1$, $R_2$, $R_3$). The rate for converting the maximum current to the corresponding voltage can be varied by using a variable resistor (varistor) as the resistor $R_2$ whereby the rated current of the circuit breaker of the present invention can be adjusted.

The long-timing circuit (9) comprises a Zener diode ($Z_4$) and transistors ($Q_5$, $Q_6$). When the voltage signal given by the voltage sensor (8) is low (normal stage), the transistor $Q_5$ is in the ON state and the transistor $Q_6$ is in the OFF state and the voltage signal is not fed to the trigger circuit (11). When the voltage signal is higher than the base potential of the transistor $Q_5$ (abnormal state), the transistor $Q_5$ is in the OFF state and the transistor $Q_6$ is in the ON state and the charging of the capacitor $C_2$ is started. When the charged voltage of the capacitor $C_2$ is reached to a predetermined voltage, the trigger circuit (11) is triggered.

The charging speed of the capacitor $C_2$ is changed by the voltage of the voltage sensor (8) to give the reverse timing characteristic, that is, the current passing through the transistor $Q_6$ is increased and the time for outputting the signal to the trigger circuit (11) is shortened depending upon an increase of the voltage signal.

When the voltage signal of the voltage sensor (8) is increased over a predetermined level in the short-timing circuit (10), Zener diode $Z_5$ is in the ON state and the transistor $Q_{10}$ is in the ON state and the current is passed through the resistor $R_{17}$ and the diode $D_{23}$ to charge the capacitor $C_8$. The charging current is charged by a constant voltae source given by the Zener diode $Z_{10}$ whereby the charging time is constant. When the charging of the capacitor (8) is completed, the signal is output to the trigger circuit (11).

The trigger circuit (11) comprises PUT (programmable Unijunction Transistor) $Q_7$ and the thyristor $Q_9$. When the charged voltage of the capacitor $C_2$ or $C_8$ in the timing circuit reaches a predetermined voltage, the PUT $Q_7$ is turned on and the thyristor is actuated to pass the current through the trip coil (4), whereby the trip mechanism is operated to open the main breaker (M).

Figure 7:
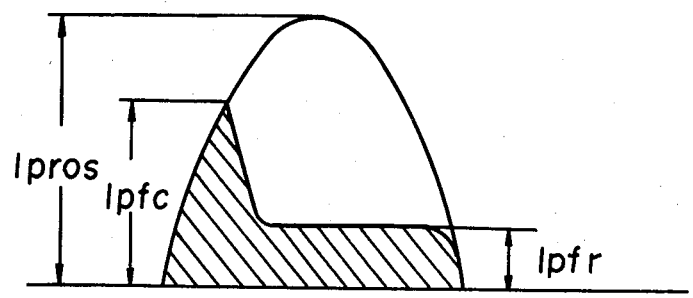
FIG. 7 shows current limiting waveform obtained by the system of the present invention.

On the other hand, the current in the normal state is fed from the main breaker (M) through the permanent fuse (PF) and the feeder circuit breakers ($F_1$), ($F_2$) . . . ($F_n$) to the loads (the resistance is set so as not to pass substantially the resistor (R)). When a short-circuit fault is caused in the circuit of the shunt circuit breaker ($F_1$), the phase of sodium metal as the inner element in the permanent fuse (PF) forming the current limiting circuit by the fault current ($I_{pros}$) is changed as solid-liquid-gas and the permanent fuse (PF) has remarkably high resistance to start the current limiting. In this case, as shown in FIG. 7, the fault current is limited to the current limited peak value ($I_{pfc}$) by the permanent fuse (PF) whereby the resistance of the permanent fuse (PF) is higher than the resistance of the resistor (R) in parallel and the fault current ($I_{pros}$) is passed through the resistor (R) and the permanent fuse (PF) and the current ($I_{pfr}$) is passed as a dynamic current.

Thus, the fault current has limited by the current limiting device. When the fault current of 200 KA is limited to 10 to 20 KA, the main breaker (M) having a current capacity of 10 to 20 KA as the selective breakable range and feeder circuit breaker ($F_1$) having a similar current capacity can be used for the selective breaking in the case of higher fault current such as 200 KA, which is the same effect to expand the selective breakable range. Moreover, the total breaking time given by the trip mechanism another main breaker can be delayed whereby the selective breaking can be attained and the selective breakable range can be enlarged. The shunt circuit breaker can be a commercial one.

In said embodiment, the breaker for wiring is used as the main breaker. Thus, it can be the other breaker such as a low-voltage air circuit breaker, a vacuum breaker to attain the similar effect.

When the selective breaking is performed out between the main breaker and the feeder circuit breaker, an air circuit breaker is usually used. Thus, even though a breaker for wiring which is economical and compact is used, the selective breakable range can be enlarged to give significant effect in the practical use.

In accordance with the present invention, the breaking delay circuit for delaying the total breaking time for a predetermined time by the trip mechanism of the main breaker is provided and also the current limiting circuit for limiting the fault current to lower than a predetermined level is provided, whereby the selective breakable range of the main circuit breaker and the feeder circuit breakers connected to the loads can be enlarged in the power breaker system.

What is claimed is:

1. In a power breaker system comprising a main breaker connected to a power source; a plurality of feeder circuit breakers connected between said main breaker and each of plural loads so as to break selectively only the feeder circuit breaker in a fault circuit when a load short-circuit is caused, an improvement which comprises a long-timing breaking delay circuit and a short-timing breaking delay circuit for delaying the total circuit breaking time by a trip mechanism of said main breaker and a current limiting device for limiting a fault current below a predetermined level, said short-timing breaking delay circuit being comprised of a Zener diode and a transistor both of which are in the on-state when a fault current passing through said main breaker increases over a predetermined level, said short-timing breaking delay circuit further including a capacitor that is charged by the output from said transistor to provide an actuating signal to said trip mechanism; said long-timing breaking delay circuit being comprised of a Zener diode, first and second switching means and a capacitor, said first switch means being operable and said second switch means being inoperable when a normal current is passed through said main breaker, said first switch means being inoperable and said second switch means being operable when a fault current passing through said main breaker decreases under a predetermined level; said capacitor of said long-timing breaking delay circuit being charged by an output from said second switch means to provide an actuating signal to said trip mechanism.

2. A power circuit breaker system according to claim 1 wherein said short-timing and long-timing breaking delay circuits are respectively actuated by a voltage signal output from a circuit for converting said fault current to the corresponding voltage.

3. A power circuit breaker system according to claim 1 wherein said current limiting device comprises a permanent fuse and a resistor connected in parallel.

4. A power circuit breaker system according to claim 3 wherein an inner element in said permanent fuse of said current limiting device is comprised of sodium metal.

5. A power circuit breaker according to claim 1 wherein said first and second switch means comprise respective first and second transistors.

* * * * *